June 23, 1964   J. S. KAWABATA   3,137,946
MOVABLE GAUGE
Filed June 26, 1961   2 Sheets-Sheet 1
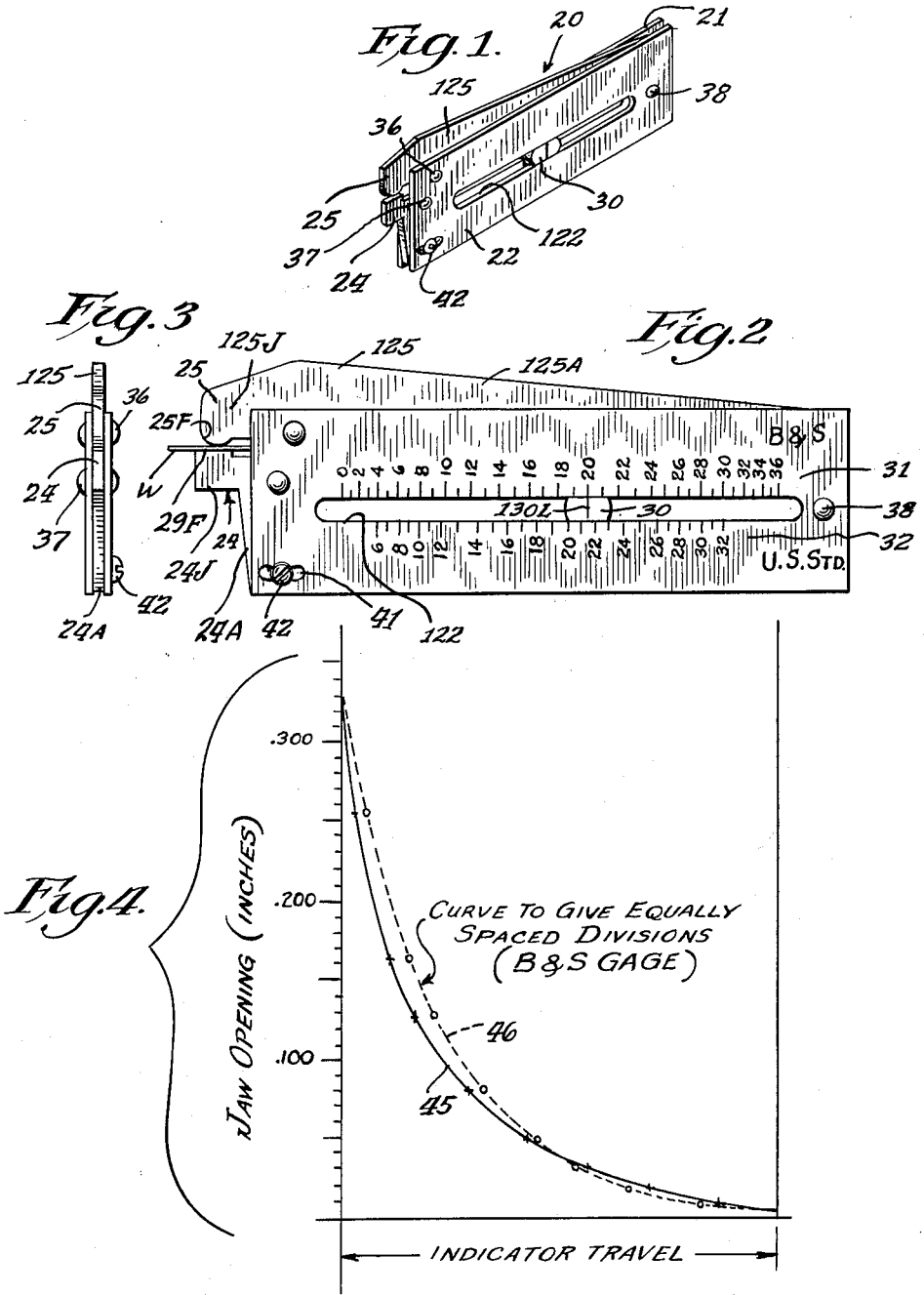
Inventor
James S. Kawabata
By Mann, Brown & McWilliams,
Attys.

June 23, 1964   J. S. KAWABATA   3,137,946
MOVABLE GAUGE
Filed June 26, 1961   2 Sheets-Sheet 2
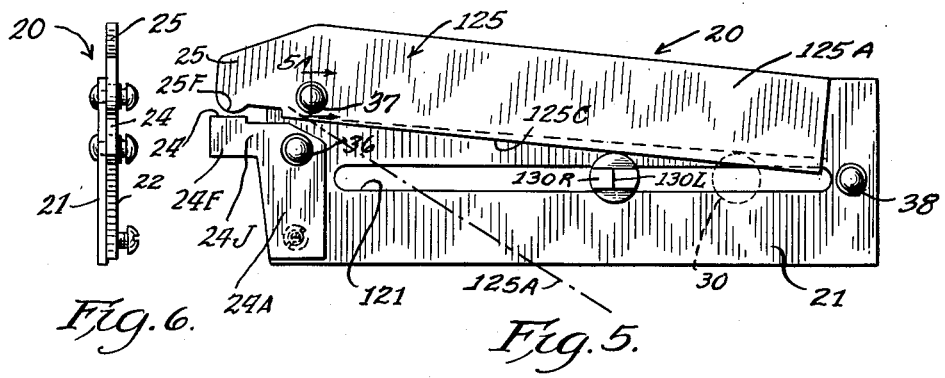
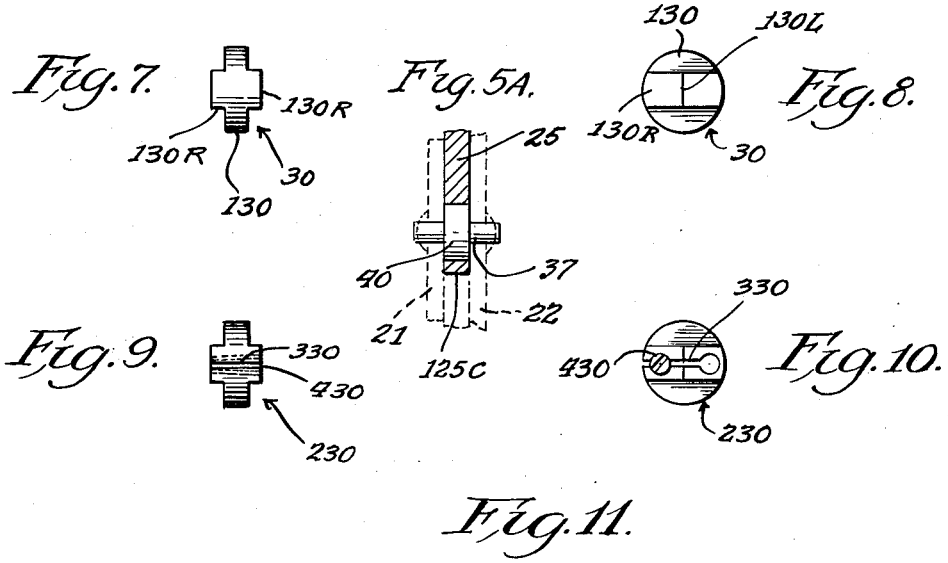
```
  B&S
  GA.   THICKNESS
  36  = .005"
  35  = .0056"   .0006"  DIFFERENCE
   0  = .3249
   1  = .2893    .0356"  DIFFERENCE
```
Inventor
James S. Kawabata
By Mann, Brown & McWilliams
Attys.

United States Patent Office 3,137,946
Patented June 23, 1964

3,137,946
MOVABLE GAUGE
James S. Kawabata, 4317 N. Hermitage, Chicago, Ill.
Filed June 26, 1961, Ser. No. 119,407
6 Claims. (Cl. 33—149)

This invention relates to movable gauges and particularly to such gauges for determining the gauge of wires, plates and the like.

Many different gauge number systems have been developed for various materials so that the thickness of such materials is designated by gauge number rather than by actual thickness. The nature or plan of these gauge number systems is such that it is quite difficult to determine the gauge of a particular material through the use of a micrometer or the like because this involves determination of actual thickness by means of the micrometer and the worker must then find the measured dimension in the usual table of the gauge number system that is being employed. As a result of this, the most common way of determining gauge is through the use of the slotted plate type of gauge where slots of different widths are formed about the edge of a plate with the successive slots corresponding to the dimensions of the different gauge numbers. The use of such slotted plate gauges, of course, involves placing successive slots over the wire or plate that is being measured until the slot is found which corresponds with the thickness of the wire of the plate.

In view of the foregoing it is a primary object of the present invention to provide a movable gauge whereby the gauge number of a particular work piece may be determined immediately upon tightening the jaws of the movable gauge against opposite sides of the work piece. A further and related object of the present invention is to enable such a movable gauge to be produced in a simple and economical form, and to produce such gauge wherein the gauge number readings may be easily made throughout the entire range of gauge numbers for which the device is intended. A further and related object is to provide a gauge wherein discrimination between gauge numbers may be visually made with comparative ease, and a further important object is to provide such a gauge wherein the indicating means are operated in a non-linear fashion with respect to the movements of the work-engaging jaws of the gauge so that the indicator provides for substantially the same spacing of gauge numbers along the scale throughout the entire range of gauge numbers.

Other and further objects of the present invention will be apparent from the following description and claims, and are illustrated in the accompanying drawings, which, by way of illustration, show preferred embodiments of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 1 is a perspective view of a movable gauge embodying the features of the invention;

FIG. 2 is a side elevational view of the gauge shown in FIG. 1;

FIG. 3 is a left hand end view of the gauge shown in FIG. 2;

FIG. 4 is a graph showing the relationship between indicator travel and jaw opening in the gauge;

FIG. 5 is a view similar to FIG. 2 but with one of the side plates of the gauge removed;

FIG. 5A is a vertical cross sectional view showing one of the structures that hold the gauge together;

FIG. 6 is a left hand end view of the structure shown in FIG. 5;

FIG. 7 is a side view of the indicator member;

FIG. 8 is a front view of the indicator member;

FIGS. 9 and 10 are side and front elevational views, respectively, of modified form of indicator member; and FIG. 11 is a table showing certain aspects of the Brown and Sharpe gauge numbering system.

For purposes of disclosure the invention is herein illustrated as embodied in a movable gauge 20 of the outside caliper type adapted for measuring wire, sheets, tubes and the like, and for indicating the measured dimension according to one or more of the standard gauge number systems. The gauge 20 comprises a body formed by a pair of spaced rectangular metal plates 21 and 22 having an upwardly facing jaw 24 and an opposed downwardly facing movable jaw 25 supported between the plates and projecting to accessible positions beyond the left hand end of the body as shown in FIGS. 1 and 2. In order that the size and cost thereof may be minimized, the gauge 20 as herein shown designed to measure only those sizes and gauges that are in most common use, and as shown in FIG. 2 of the drawings, a movable indicator 30 that is controlled by the spacing of the jaws 24 and 25 is movable along the body of the gauge between two scales 31 and 32 showing two of the more widely used gauge member systems that are applied to size or thickness. The scale 31 shows Brown and Sharpe gauge numbers from 0 to 36, which scale 32 shows U.S. Standard gauge numbers from 6 to 32, and this range is sufficient to cover most situations encountered in practice.

The movable gauge 20 of this invention is arranged to take into account a peculiarity of the most common gauge number systems which has heretofore made it extremely difficult to discriminate between the gauges of smaller or thinner wires, plates or the like. Thus, as shown in FIG. 11 of the drawings, the difference between B & S gauges "0" and "1" is .0356 inch while the difference between B & S gauges 35 and 36 which relate to extremely small wire and the like is but .0006 inch. This non-linear relation between conventional gauge numbers and corresponding material thickness has heretofore made it impossible to determine material gauge except by the use of slotted plate gauges or by micrometer and subsequent conversion of such measurement into gauge number.

The movable gauge 20 of this invention overcomes such difficulties by utilizing gauge number scales 31 and 32 wherein the gauge number indications are spaced apart in a substantially uniform manner, and as will be described hereinafter, the movable jaw 25 is operatively associated with the movable indicator 30 in such a way that the actual thickness measurements made by the jaws 24-25 are converted into the proper gauge number indications along the scales 31 and 32.

The plates 21 and 22 are secured together in spaced relation by three riveted studs 36, 37 and 38, of identical form, the studs 36 and 37 being located adjacent the left hand end of the plates 21 and 22 and being arranged to function in the support of the jaws 24 and 25 respectively, while the third stud 38 is located near the right hand ends of the plates and serves only as a spacing and connecting means. The spacer studs are of cylindrical form with reduced ends that extend through openings in the plates and are riveted at the outer ends to hold the plates 21 and 22 against shoulders formed at the junctures of the cylindrical spacer portions 40 of the studs.

The fixed or stationary jaw 24 of the gauge 20 is settable to facilitate original assembly and allow subsequent compensation for wear, and as herein shown the jaw 24 is formed as a bell crank made from metal plate stock to provide an arm 24J and an arm 24A with a bearing opening at their juncture that embraces the portion 40 of the stud 36. The arms of the bell crank are arranged at substantially 90° so that the arm 24J projects to the left to form the working part of the jaw 24 while the arm 24A projects downwardly between the plates 21 and 22 and past an arcuate slot 41 that is centered on the stud 36. A binder head screw 42 extends through the slot 41 and is threaded into the arm 24A so that the bell crank may be fixed in the desired adjusted relation.

The movable jaw 25 is provided as the left hand end portion 125J of an elongated rigid lever 125 that is made from metal plate and is pivotally supported on the enlarged central portion 40 of the stud 37 so that the left hand end portion 125J of the lever 125 projects left into position opposite or over the arm 24J while the other, or longer arm 125A extends to the right between the plates 21 and 22 and substantially to the stud 38. Thus, in pivotal movement of the lever 125, the jaw 25 is moved toward and away from the fixed jaw 24, the jaw 24 having a flat gauge face 24F facing upwardly toward an opposed arcuate or convex gauge face 25F formed on the jaw 25.

In a gauging operation, the work piece W is rested on the stationary jaw face 24F, the lever 125 is rocked counterclockwise so that the jaw face 25F engages the upper face of the work piece W, FIG. 2, and when this has been done, the spacing of the faces 24F and 25F constitutes a measurement of the thickness of the work piece. The angular setting or position of the arm 125 at this time constitutes a function of the measured thickness of the work piece W, and under and in accordance with the present invention indicator 30 is operatively associated with and controlled by the position of the lever 125 to indicate the measured thickness of the work piece W in terms of gauge numbers on the scales 31 and 32. The gauge number indicator 30, under this invention, is operatively associated with the movable lever 125 in such a way that the angular positioning of the lever 125 is translated or converted into gauge number indications in a non-linear fashion that renders possible accurate visual discrimination between indicated gauges, or gauge numbers, throughout the entire range of the movable gauge 20.

In attaining this non-linear conversion, the relationship of the scales 31 and 32 and the path of the indicator to the range of swinging movement of the arm 125A plays an important part. Thus, as shown in FIG. 2, the scales 31 and 32 are formed along the upper and lower edges of a horizontal slot 122 formed in the plate 22 in downwardly spaced relation with respect to the stud 37. A similar slot 121 is formed in the same position in the plate 21 as shown in FIG. 5, and these slots 121 and 122 serve as a guideway for the indicator 30. As shown in FIGS. 5, 7 and 8 the indicator 30 comprises a circular disc 130 slidably disposed between the plates 21 and 22, and of a diameter greater than the width of the slots 121 and 122, and on opposite faces of the disc, ribs 130R are provided that ride slidably in the slots 121 and 122. A vertical indicator line 130L is provided at the center of each rib 130R to act as a pointer along scales such as the scales 31 and 32.

The disc 130 is thus disposed in position to engage the lower or control surface 125C of the arm 125A and it is this engagement that determines the gauge number indication for any particular setting or spacing of the jaws 24 and 25. With the slots 121 and 122 related to the range of swinging movement of the arm 125A as described above, the arm 125A crosses the slot at a relatively large acute angle when the jaw 25 is in its fully open position, and as the jaw 25 is moved toward closed relation, this angle becomes progressively smaller, as will be evident in FIG. 5. This varying relationship produces the desired non-linear indication of the extent of the jaw opening.

In FIG. 4, the curve 45 has been shown that plots jaw opening against indicator travel in the gauge structure herein shown, and it will be evident that a non-linear relation has been established which renders it possible to visually discriminate between gauge numbers, particularly in the higher or more sensitive range of gauge numbers. As will be evident from the slope of the curve 45, the ratio of indicator travel to differences in jaw opening is relatively small where larger wires or plates are being measured, and is relatively large in those ranges where small or thin wires or plates are measured, and it is this characteristic that enables the gauge numbers to be easily read on the scales 31 or 32 throughout the entire range thereof.

It will be noted in FIG. 4 that a further curve 46 has been plotted showing the varying ratio of indicator travel to jaw opening that would be required to give equally spaced divisions on the scale 31 for the Brown and Sharpe gauge number system, and while the curve 46 deviates slightly from the curve 45, it is sufficiently close to result in substantially uniform spacing of the divisions required for the Brown and Sharpe system, as will be evident in the scale 31 of FIG. 2.

It should be noted that the gauge 20 is capable of having four different scales placed thereon, the two scales 31 and 32 being provided on the plate 22 along the slot 122, and two additional scales, reading in the opposite direction, or in other words, from right to left, may be placed on the plate 21 along the respective edges of the slot 121.

The different scales, relating to different gauge number systems, will necessarily involve different variations in the spacing of their scale divisions, as will be evident from a comparison of the scales 31 and 32. However, since the gauge number systems have the common characteristic of progressively small dimensional differences between successive gauge numbers as the measured dimension decreases, the non-linear translation of the measured dimension that is attained by the gauge 20 attains the same general clarity of indication with respect to at least four of the common gauge number systems.

As herein shown the slots 121 and 122, and the control surfaces 125C or lower surface of the arm 125A are formed as straight flat surfaces, and while adherance to straightness in these elements limits the finer or more exact control that might otherwise be attained as to the spacing of the gauge marks, it simplifies and reduces the cost of production of the gauge.

In the operation or use of the gauge 20, the indicator is moved to the left, preferably to the extreme left end of its range of movement, and the arm 125A is pressed downwardly into engagement with the indicator. The work piece is then put into position on the stationary jaw 24, and the movable jaw 25 is moved toward its closed position by actuation of the indicator 30 in a right hand direction. When the face 25F of the movable jaw engages the upper surface of the work piece, the right hand movement of the indicator 30 is stopped, and the indicating line 130L will then be in its final indicating position so that the gauge of the work piece may be read directly from the appropriate one of the gauge scales.

As a means for compensating for wear of the jaws or the engaging surfaces of the indicator and the arm 125, a more elaborate indicator 230 may be provided as shown in FIGS. 9 and 10. This indicator has the same general form as the indicator 30, but is horizontally slotted at 330 and a tapered screw 430 is threaded into a correspondingly threaded tapered bore near the end of the slot 330. By operation of the screw 430 the vertical dimension of the cylindrical body of the indicator 230 may be increased to compensate for wear. When the indicator 230 is used, added clearance must be provided in the slots 121 and 122, but this does not affect the accuracy of the gauge since it is the engagement of the indicator with the lower edges of the slots that controls the relationship between arm 125 and the indicator.

It is again pointed out that the gauge 20 illustrated herein is of limited capacity so that it will serve to determine the gauges of the ranges of material most commonly encountered in engineering and construction work, but it must be recognized that by increasing the size, weight and strength of the parts of gauge, it may be constructed to function throughout the entire range of at least four systems.

From the foregoing description it will be apparent that the present invention provides a new and improved movable gauge whereby the gauge number of a particular work piece may be quickly and easily determined, and it will also be apparent that the gauge of the present invention provides a spacing of the gauge number indications on the scales thereof which enables readily visual discrimination between gauge number indications throughout the entire gauge numbering system.

It will also be apparent that the present invention has provided a gauge which is extremely simple in construction and which is quite convenient to use, and moreover, that the gauge number indications may be accurately obtained according to any one of several gauge number scales that are or may be provided on the gauge.

Thus, while I have illustrated and described preferred embodiments of my invention it is to be understood that changes and variations may be made by those skilled in the art without departing from the spirit and scope of the appending claims.

I claim:

1. In a movable gauge for determining the thickness of wires, plates and the like in accordance with conventional gauge number systems, a body having a fixed jaw mounted thereon, an opposed movable jaw pivoted on said body for swinging movement toward and away from said fixed jaw, an indicator movable along a predetermined path on said body, an arm rigid with said movable jaw and swingable therewith, said arm extending across said path at a relatively large acute angle thereto when said movable jaw is widely spaced with respect to the fixed jaw and being positioned to intersect with path at a progressively smaller acute angle as the movable jaw is moved toward the fixed jaw, said arm having a continuous control surface extended longitudinally thereof, a disc forming part of said indicator engageable with said control surface to govern the position of said indicator along the scale in accordance with the position of said arm, said indicator in any adjusted position acting to limit opening movement of the movable jaw, and a scale along said path graduated in gauge marks located at positions coordinated with the jaw openings required for each of the respective gauge numbers.

2. In a movable gauge for determining the thickness of wires, plates and the like in accordance with conventional gauge number systems, a body having a fixed jaw mounted thereon, an elongated lever pivoted near one of its ends on said body to provide a short arm on the side of the pivot and constituting an opposed movable jaw adapted for swinging movement toward and away from said fixed jaw and said lever providing a longer indicating arm on the other side of the pivot, means on said body providing an elongated guideway, an indicator movable along said guideway and including a disc, said indicating arm extending across said guideway at a relatively large acute angle thereto when said movable jaw is widely spaced with respect to the fixed jaw and being positioned to intersect with guideway at a progressively smaller acute angle as the movable jaw is moved toward the fixed jaw, said indicating arm having a continuous control surface extended longitudinally thereof for engagement by the disc of said indicator to govern the position of said indicator along the guideway in accordance with the position of said indicating arm, and a gauge number scale on the body along said guideway providing a scale graduation for each gauge number and coordinated with the jaw openings corresponding to the gauge numbers included on the scale.

3. A gauge according to claim 2 wherein said guideway and said control surface are of straight rectilinear form and wherein said disc engages said control surface laterally of the guideway when the jaws are relatively close to each other.

4. In a movable gauge of the character described for determining the thickness of wires, plates and the like in accordance with conventional gauge number systems, a pair of elongated flat plates secured together in a spaced face to face relation to form a body, a fixed jaw and a movable jaw both disposed in part between said plates and extended beyond one end of the body to provide opposed work-engaging faces, means for adjustably establishing the fixed position of the fixed jaw, means supporting the movable jaw on said body near said one end for swinging movement between open and closed positions with respect to said fixed jaw, said movable jaw having an integral arm extended therefrom toward the other end of the body for swinging movement with the movable jaw, said pair of plates having aligned guide slots therein in such a position and relation that when said jaw is in its open position said arm crosses said slots at a relatively large acute angle thereto and so that the arm crosses said slots at a progressively smaller acute angle as the movable jaw is moved toward its closed position, an indicator mounted in said slots in position to engage said arm and having an enlarged contact disc located between said plates and having a diameter greater than the width of said slots and arranged so that said arm is engaged by the periphery of said disc, and division marks along one of said slots forming a scale calibrated according to jaw-opening dimensions corresponding to the various gauge numbers of a selected gauge number system and graduated in such gauge numbers.

5. In a movable gauge of the character described for determining the thickness of wires, plates and the like in accordance with conventional gauge number systems, a pair of elongated flat plates, studs securing the plates together in a spaced face to face relation to form a body, a fixed jaw and a movable jaw both disposed in part between said plates and extended beyond one end of the body to provide opposed work-engaging faces, the movable jaw being supported on one of said studs near said one end of the body for swinging movement between open and closed positions with respect to said fixed jaw, said movable jaw having an integral arm extended therefrom toward the other end of the body for swinging movement with the movable jaw, said pair of plates having aligned guide slots therein in such a position and relation that when said jaw is in its open position said arm crosses said slots at a relatively large acute angle thereto and so that the arm crosses said slots at a progressively smaller acute angle as the movable jaw is moved toward its closed position, an indicator mounted in said slots in position to engage said arm and comprising elements sliding in said slots and an internal contact disc of a diameter greater than the width of said slots in position for engagement of the arm by the periphery of said disc, and division marks along one of said slots forming a scale calibrated according to jaw-opening dimensions corresponding to the various gauge numbers of a selected gauge number system and graduated in such gauge numbers.

6. In a movable gauge of the character described for determining the thickness of wires, plates and the like in accordance with conventional gauge number systems, a pair of elongated rectangular flat plates, studs securing said plates together in a spaced face to face relation to form a body, a fixed jaw and a movable jaw both disposed in part between said plates and extended beyond one end of the body to provide opposed work-engaging faces, the movable jaw being supported by one of said studs on said body near said one end of the body for swinging movement between open and closed positions with respect to said fixed jaw, said movable jaw having an integral arm extended therefrom toward the other end of the body for swinging movement with the movable jaw, said pair of plates having aligned guide slots therein extended parallel to the long edges of the plates in such a position and relation that when said jaw is in its open position said arm crosses said slots at a relatively large acute angle thereto and so that the arm crosses said slots at a progressively smaller acute angle as the movable jaw is moved toward its closed position, an indicator mounted in said slots in position to engage said arm and including parts riding in said slots and an internal disc of a diameter greater than the width of said slots and positioned to engage said arm, and division marks along one of said slots forming a scale calibrated according to jaw-opening dimensions corresponding to the various gauge numbers of a selected gauge number system and graduated in such gauge numbers.

References Cited in the file of this patent

UNITED STATES PATENTS

| | | |
|---|---|---|
| 140,554 | Smith | July 1, 1873 |
| 611,971 | Lutz | Oct. 4, 1898 |
| 898,565 | Duncan | Sept. 15, 1908 |
| 1,397,890 | Johnson | Nov. 22, 1921 |
| 2,603,872 | Jones | July 22, 1952 |

FOREIGN PATENTS

| | | |
|---|---|---|
| 5,185 | Great Britain | Apr. 14, 1886 |